(12) United States Patent
Piel

(10) Patent No.: US 11,282,073 B2
(45) Date of Patent: Mar. 22, 2022

(54) MULTI-PARTY PAYMENT CARD PROCESSING SYSTEMS AND METHODS WITH FRIENDLY FRAUD DETECTION

(71) Applicant: MasterCard International Incorporated, Purchase, NY (US)

(72) Inventor: Brian Piel, Ballwin, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 576 days.

(21) Appl. No.: 15/782,721

(22) Filed: Oct. 12, 2017

(65) Prior Publication Data

US 2019/0114624 A1   Apr. 18, 2019

(51) Int. Cl.

| | |
|---|---|
| *G06Q 20/40* | (2012.01) |
| *G06Q 30/02* | (2012.01) |
| *G06Q 20/32* | (2012.01) |
| *G06Q 20/34* | (2012.01) |
| *G06Q 20/38* | (2012.01) |
| *G06Q 20/36* | (2012.01) |
| *G06Q 20/10* | (2012.01) |
| *G06Q 30/00* | (2012.01) |
| *G06Q 30/06* | (2012.01) |
| *G06Q 20/08* | (2012.01) |
| *G06Q 20/12* | (2012.01) |

(52) U.S. Cl.
CPC ......... *G06Q 20/3674* (2013.01); *G06Q 20/08* (2013.01); *G06Q 20/10* (2013.01); *G06Q 20/12* (2013.01); *G06Q 20/382* (2013.01); *G06Q 20/401* (2013.01); *G06Q 20/4016* (2013.01); *G06Q 30/0185* (2013.01); *G06Q 30/0609* (2013.01)

(58) Field of Classification Search
CPC ................. G06Q 20/00–425; G06Q 30/00–08
See application file for complete search history.

(56) References Cited

U.S. PATENT DOCUMENTS

| | | | |
|---|---|---|---|
| 5,915,022 A | * | 6/1999 | Robinson ............. G06Q 20/401 705/75 |
| 6,783,065 B2 | | 8/2004 | Spitz et al. |
| 8,271,396 B2 | | 9/2012 | Ronning et al. |

(Continued)

OTHER PUBLICATIONS

Ron White, How Computers Work, Que, Seventh Edition, Oct. 15, 2003 (Year: 2003).*

(Continued)

*Primary Examiner* — John W Hayes
*Assistant Examiner* — Chenyuh Kuo
(74) *Attorney, Agent, or Firm* — Armstrong Teasdale LLP

(57) ABSTRACT

An electronic payment card processing system and method includes at least one host computing device having at least one processor in communication with a memory device and a multi-party payment processing system and network for processing payment card transactions. The at least one host computing device retrieves delivery data for a purchased item associated with at least one disputed charge by a cardholder of a payment card transaction that was previously approved through the multi-party payment processing system, and analyzes the retrieved delivery data to determine a basis for the at least one disputed charge including whether the at least one disputed charge is friendly fraud.

19 Claims, 7 Drawing Sheets

(56) References Cited

U.S. PATENT DOCUMENTS

| | | | | |
|---|---|---|---|---|
| 9,641,342 | B2* | 5/2017 | Sriram | H04L 63/126 |
| 2002/0016726 | A1* | 2/2002 | Ross | G06Q 10/08 |
| | | | | 705/339 |
| 2002/0099649 | A1* | 7/2002 | Lee | G06Q 20/4016 |
| | | | | 705/38 |
| 2002/0103767 | A1* | 8/2002 | Bournat | G06Q 20/12 |
| | | | | 705/75 |
| 2004/0117298 | A1 | 6/2004 | Algiene et al. | |
| 2008/0154783 | A1 | 6/2008 | Rule et al. | |
| 2010/0114774 | A1 | 5/2010 | Linaman et al. | |
| 2011/0246357 | A1 | 10/2011 | Young et al. | |
| 2012/0303525 | A1 | 11/2012 | Sahadevan | |
| 2013/0198060 | A1* | 8/2013 | Whitehouse | G06Q 20/22 |
| | | | | 705/39 |
| 2013/0212175 | A1* | 8/2013 | Cheng | G06Q 50/01 |
| | | | | 709/204 |
| 2014/0344155 | A1* | 11/2014 | Liu | G06Q 20/322 |
| | | | | 705/44 |
| 2016/0224955 | A1* | 8/2016 | Domeracki | G06Q 20/20 |
| 2016/0379216 | A1* | 12/2016 | Wang | G06Q 20/407 |
| | | | | 705/44 |
| 2019/0012637 | A1* | 1/2019 | Gillen | H04L 9/0637 |
| 2019/0080284 | A1* | 3/2019 | Kim | G06Q 10/0833 |
| 2019/0213538 | A1* | 7/2019 | Bebout | G06Q 10/0835 |

OTHER PUBLICATIONS

Ron White, How Computers Work, Oct. 2003, QUE, Seventh Edition (Year: 2003).*

\* cited by examiner

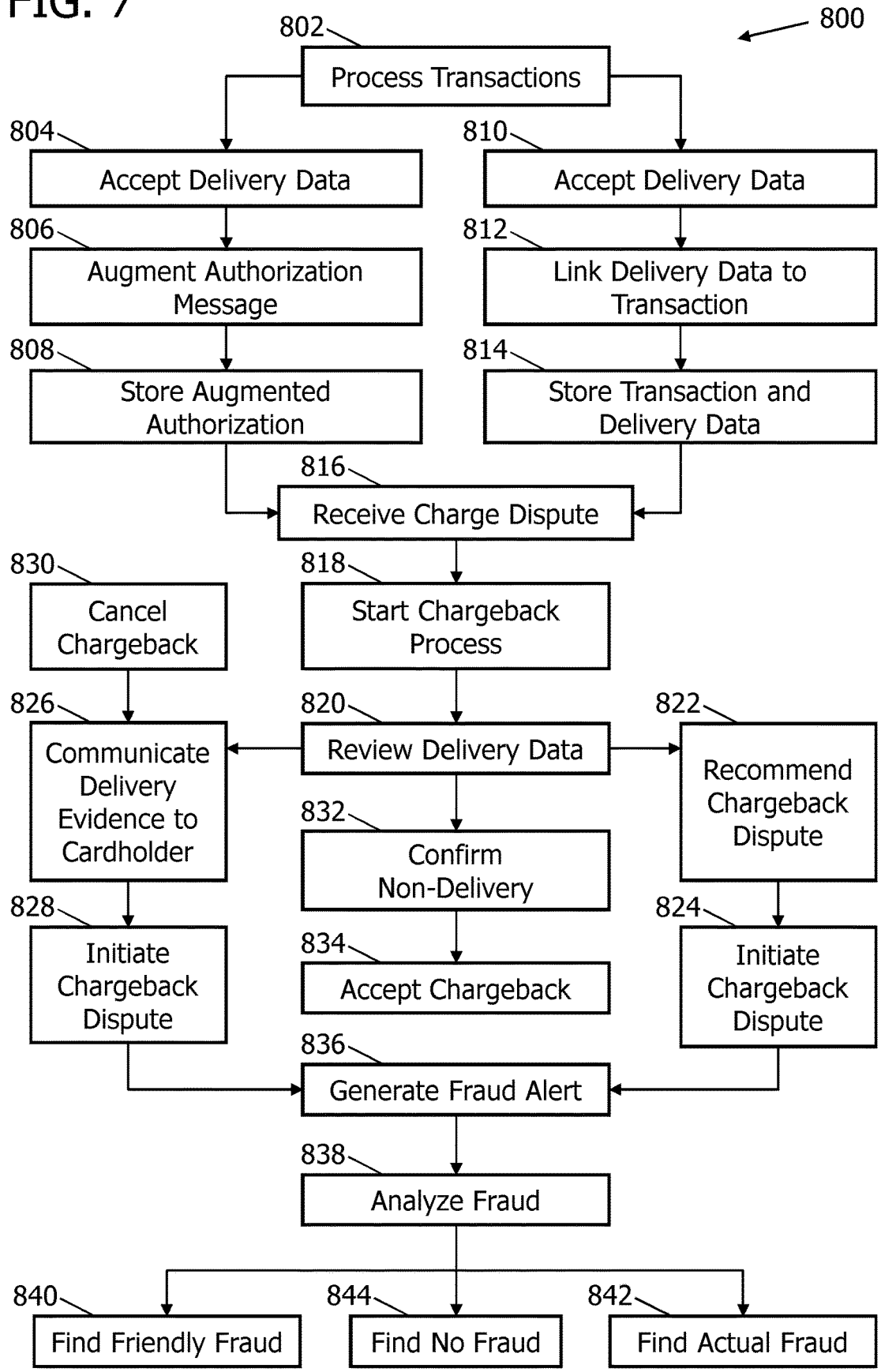

MULTI-PARTY PAYMENT CARD PROCESSING SYSTEMS AND METHODS WITH FRIENDLY FRAUD DETECTION

BACKGROUND

This disclosure relates generally to electronic payment systems for payment card transactions, and more specifically to electronic payment card systems and methods with friendly fraud detection capability in chargeback processing relating to disputed charges in CNP transactions.

Electronic payment card processing systems are in widespread use to process transactions between a payment card holder, a merchant, an acquirer bank, and an issuing bank. The transaction may involve the physical payment card itself at a point-of-sale terminal, a device associated with a payment card (or an account of a payment card) that includes payment card information and digital payment capability (e.g., a smart phone device including a digital wallet), or manually entered payment card information via another device such as a computer device interfacing with a merchant online. Sophisticated multi-party payment card processing systems are known to process payment card transactions, confirm authorized charges, manage payments and transfer of funds, confirm payment status, and compute available credit balances.

When a cardholder uses a payment card (e.g., a credit card or a debit card) to initiate a transaction to purchase goods or services from a merchant, an acquiring bank (i.e., the merchant's bank) will typically reimburse the merchant for the transaction. The acquiring bank will then settle those funds with an issuing bank of the account corresponding to the payment card by presenting transaction data, associated with the transaction, to a payment processor. In a process known as clearing, transaction data is communicated from the acquiring bank through the payment processor to the issuing bank. After clearing, settlement of the final payment occurs via the payment processor. Settlement is a process used to exchange funds between the acquiring bank and the issuing bank for the net value of a batch of all monetary transactions that have cleared for that processing day.

In general, a cardholder may initiate a transaction dispute, known as a chargeback, with the issuing bank. The chargeback is processed over the payment network to return some or all of the funds associated with the disputed transaction to the account corresponding to the payment card. Typically, the issuing bank immediately issues a credit to the account for the amount of the transaction. The issuing bank then sends a chargeback request to an issuing bank processor, and the request is collected with other requests and submitted in a batch to the payment processor. The chargeback request is then typically sent to the acquiring bank or an acquirer processor. However, the merchant may dispute the chargeback with the assistance of the acquiring bank. Based on the available evidence, the issuing bank and the acquiring bank may then attempt to mediate the charge through an arbitration proceeding. Depending on the outcome, the cardholder, the issuing bank, the acquiring bank, or the merchant may be left with the cost of the transaction.

Anti-fraud measures are becoming increasing prevalent in processing payment by card transactions. Certain types of transactions, specifically so-called card-not-present (CNP) transactions made between cardholders and merchants at different locations without the payment card having to be physically presented, specific challenges arise from an anti-fraud perspective. Specifically, in instances wherein disputed charges on a payment card account relate to an authorized purchase that was properly posted to a cardholder's account but disputed after the fact, chargebacks can sometimes be problematic. Particularly with respect to instances of "friendly fraud" wherein a cardholder unmaliciously disputes a proper charge on the payment system, the chargeback may result in the merchant or the issuer bank absorbing the loss when there actually was no problem with the disputed transaction. Over a large cardholder base, such losses are substantial and would rather be avoided.

Additionally, malicious persons can exploit vulnerabilities in a conventional chargeback system to commit actual fraud and avoid having to pay for purchases by intentionally disputing card charges on grounds that either the issuer or the merchant bank will not easily be able to disprove. In many cases, friendly fraud and actual fraud scenarios of this type are difficult to distinguish. All parties to the payment system would benefit from improved chargeback systems and processes that more efficiently and accurately allow for friendly fraud detection and resolution or actual fraud detection from manipulative attempts to exploit conventional charge back processes. Improvements are accordingly desired.

BRIEF DESCRIPTION

In one aspect, the disclosure provides an electronic payment card processing system including at least one host computing device comprising at least one processor in communication with a memory device and a multi-party payment processing system and network for processing payment card transactions. The at least one host computing device is configured to: retrieve delivery data for a purchased item associated with at least one disputed charge by a cardholder of a payment card transaction that was previously approved through the multi-party payment processing system; and analyze the retrieved delivery data to determine a basis for the at least one disputed charge including whether the at least one disputed charge is friendly fraud.

In another aspect, the disclosure provides a method for electronically responding to disputed charges for payment card transactions processed by a multi-party payment processing system. The method is implemented with at least one host computing device having at least one processor in communication with a memory device and the multi-party payment processing system. The method includes: retrieving, by the host computing device, delivery data for a purchased item associated with at least one disputed charge by a cardholder of a payment card transaction that was previously approved through the multi-party payment processing system; and analyzing the retrieved delivery data to determine a basis for the at least one disputed charge including whether the at least one disputed charge is friendly fraud.

In another aspect, the disclosure provides a non-transitory computer readable medium that includes computer executable instructions for electronically responding to disputed charges for payment card transactions processed by a multi-party payment processing system. When executed by at least one host computing device having at least one processor in communication with a memory device and the multi-party payment processing system, the computer executable instructions cause the at least one host computing device to: retrieve delivery data for a purchased item associated with at least one disputed charge by a cardholder of a payment card transaction that was previously approved through the multi-party payment processing system; and analyze the retrieved delivery data to determine a basis for the at least one disputed charge including whether the at least one disputed charge is friendly fraud.

BRIEF DESCRIPTION OF THE DRAWINGS

FIG. 7 shows an exemplary process of chargeback dispute analysis with friendly fraud detection for the system shown in FIGS. 1-4.

DETAILED DESCRIPTION OF THE DISCLOSURE

Figure 1:
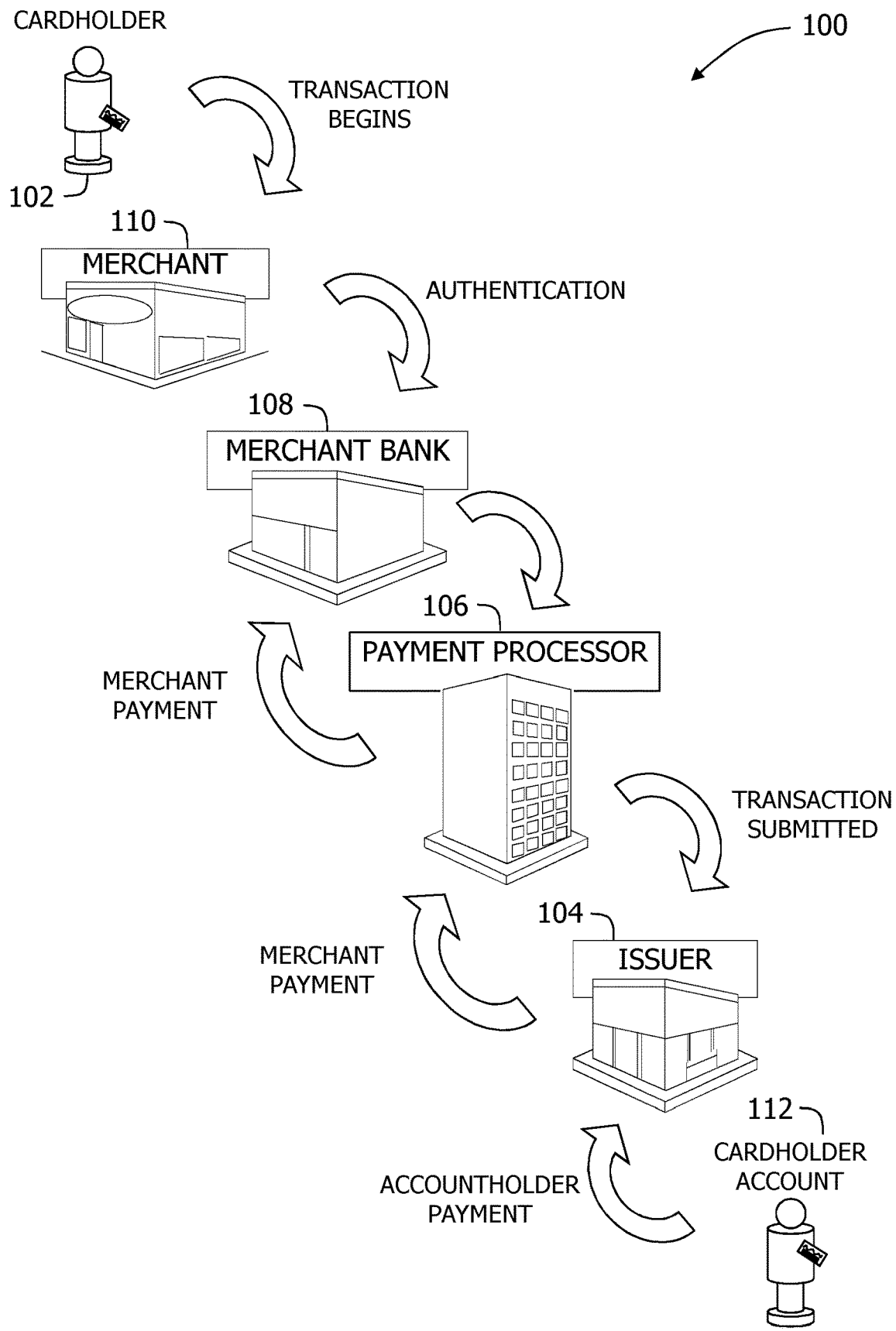
FIG. 1 is a schematic diagram illustrating an exemplary multi-party payment network system for processing payment card transactions.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

In the payment card processing systems of the disclosure, certain problems and challenges in assessing or evaluating disputed charges are addressed and overcome. Such problems are described in detail below and include inability to evaluate chargeback disputes as valid or possible fraudulent, inability to efficiently process chargebacks and lodge possible chargeback disputes that may be successful, and inefficiencies in resolving chargeback disputes relating to CNP payment transactions.

The systems and methods of the disclosure facilitate automated and streamlined evaluation of disputed charges from the chargeback process perspective by retrieving electronic evidence of delivery of items relating to the CNP transactions that are disputed. By considering evidence of delivery (or non-delivery) of goods related to disputed charges, the system can evaluate and distinguish charges that are validly disputed and charges that are questionably disputed and possibly fraudulent. Based on the considered delivery data, the system can recommend to a merchant bank or card issuer to dispute (or not dispute) chargebacks. Information feedback may be provided to a cardholder regarding disputed charges and the assessment thereof by the system that may result in withdrawal of disputed charges and avoidance of chargeback disputes. If not withdrawn, chargebacks can be effectively disputed and/or resolved with a much greater likelihood of success in view of the delivery evidence and other evidence stored on and retrieved by the system, while also identifying disputed charges that are not fraudulent, disputed charges that relate to friendly fraud scenarios, and perhaps even actual fraud relating to disputed charges.

In one embodiment, the disclosure provides an electronic payment card processing system including at least one host computing device comprising at least one processor in communication with a memory device and a multi-party payment processing system and network for processing payment card transactions. The at least one host computing device is configured to: retrieve delivery data for a purchased item associated with at least one disputed charge by a cardholder of a payment card transaction that was previously approved through the multi-party payment processing system; and analyze the retrieved delivery data and determine a basis for the at least one disputed charge including whether the at least one disputed charge is friendly fraud.

The at least one host computing device is further configured to accept delivery data for purchased items associated with payment card transactions that were previously approved through the multi-party payment processing from at least one of a delivery carrier device or a merchant device. The at least one host computing device is configured to: retrieve, by the at least one host computing device, respective ones of the authorization messages for the previously approved payment card transactions; augment the respective ones of the retrieved authorization messages with accepted delivery data corresponding to a purchased item in the respective previously approved payment card transaction; and store the augmented authorization messages. Additionally, the host computing device may also be configured to: link, within a database, at least a portion of the accepted delivery data corresponding to a purchased item in the previously approved payment card transaction to transaction data for the previously approved payment card transactions by the multi-party payment processing system; and store the linked portion of the delivery data and the transaction data.

When a chargeback is issued via the multi-party payment processing system in response to the at least one disputed charge, the at least one host computing device is configured to generate a recommendation, based on the determined basis for the at least one disputed charge, whether to initiate a chargeback dispute relating to the previously approved payment card transaction via the multi-party payment processing system. The at least one host computing device may also be configured to generate, based on the determined basis for the at least one disputed charge, a communication to the cardholder relating to the determined basis for the dispute and the considered delivery data, and request confirmation from the cardholder whether to continue disputing the at least one disputed charge after receiving the communication. The at least one host computing device may be configured to, in reply to the requested confirmation, either cancel the chargeback or initiate a chargeback dispute in the multi-party payment processing system.

The at least one host computing device may be configured to generate a fraud alert based on the determined basis for the at least one disputed charge. The at least one host computing device may be configured to identify the at least one disputed charge as relating to one of friendly fraud, actual fraud, or no fraud. The at least one host computing device may be a server system.

In another embodiment, the disclosure provides a method for electronically responding to disputed charges for payment card transactions processed by a multi-party payment processing system. The method is implemented with at least one host computing device having at least one processor in communication with a memory device and the multi-party payment processing system. The method includes: retrieving, by the host computing device, delivery data for a purchased item associated with at least one disputed charge by a cardholder of a payment card transaction that was previously approved through the multi-party payment processing system; and analyzing the retrieved delivery data and determine a basis for the at least one disputed charge including whether the at least one disputed charge is friendly fraud.

The method also includes accepting delivery data for purchased items associated payment card transaction that were previously approved through the multi-party payment processing from at least one of a delivery carrier device or a merchant device. The method may include: retrieving, by the at least one host computing device, respective ones of the authorization messages for the previously approved payment card transactions; augmenting the respective ones of the retrieved authorization messages with accepted delivery data corresponding to a purchased item in the respective one of the previously approved payment card transactions; and storing the augmented authorization messages. The method may also include: linking, by the at least one host computing device, a portion of the accepted delivery data corresponding to a purchased item in the previously approved payment card transaction to transaction data for the previously approved payment card transactions by the multi-party payment processing system; and storing the linked portion of the delivery data the transaction data.

When a chargeback is issued via the multi-party payment processing system in response to the at least one disputed charge, the method further includes generating a recommendation, based on the determined basis for the at least one disputed charge, whether to initiate a chargeback dispute relating to the previously approved payment card transaction via the multi-party payment processing system. The method also includes: generating, by the at least one host computing device and based on the determined basis for the at least one disputed charge, a communication to the cardholder relating to the determined basis for the dispute and the considered delivery data. The method also includes requesting confirmation from the cardholder whether to continue disputing the at least one disputed charge after receiving the communication. The method includes, in reply to the requested confirmation, either cancelling the chargeback or initiating a chargeback dispute in the multi-party payment processing system.

The method also includes generating a fraud alert based on the determined basis for the at least one disputed charge, and identifying the at least one disputed charge as relating to one of friendly fraud, actual fraud, or no fraud.

In another embodiment, the disclosure provides a non-transitory computer readable medium that includes computer executable instructions for electronically responding to disputed charges for payment card transactions processed by a multi-party payment processing system. When executed by at least one host computing device having at least one processor in communication with a memory device and the multi-party payment processing system, the computer executable instructions cause the at least one host computing device to: retrieve delivery data for a purchased item associated with at least one disputed charge by a cardholder of a payment card transaction that was previously approved through the multi-party payment processing system; and analyze the retrieved delivery data and determine a basis for the at least one disputed charge including whether the at least one disputed charge is friendly fraud.

The technical problems addressed by the payment card processing systems and methods of the disclosure include at least one of: (i) fraudulent charge disputes in a multi-party payment card processing system; (ii) inefficient chargeback processes in a multi-party payment card processing system; (iii) inability to dispute chargebacks with readily available electronic records; (iv) financial loss via vulnerabilities in automated chargeback process in a multi-party payment card processing system; (v) inability to distinguish non-fraudulent charge disputes from fraudulent disputes in the chargeback process of a multi-party payment card processing system; (vi) inability to distinguish between different types of fraud in disputed charges in the multi-party payment system; and (vii) inability to efficiently provide cardholder feedback that may avoid disputed charges and chargebacks in a multi-party payment card processing system.

The payment card processing systems and methods of the disclosure may be implemented using computer programming or engineering techniques including computer software, firmware, hardware, or any combination or subset thereof, wherein the technical effects may be achieved by (i) providing a more efficient processing of charges and improved electronic record keeping in a multi-party payment card processing system; (ii) provide electronic evidence of delivery of goods to evaluate possibly fraudulent charge disputes in a multi-party payment card processing system; (iii) provide electronic retrieval and review of delivery data to resolve chargeback process in a multi-party payment card processing system with less time and effort by agents of the multi-party payment card processing system; (iv) providing electronic evidence to more quickly and dispute chargebacks in the multi-party payment card processing system; (v) reduce instances of financial loss via vulnerabilities in automated chargeback process in a multi-party payment card processing system; (vi) provide electronic capability to distinguish non-fraudulent charge disputes from fraudulent disputes in the chargeback process of a multi-party payment card processing system; (vii) provide electronic capability to distinguish between different types of fraud in disputed charges in the multi-party payment system; and (viii) provide electronic capability to efficiently communicate information to a cardholder that may avoid disputed charges and related chargebacks in a multi-party payment card processing system.

The resulting technical benefits achieved by the payment card processing systems and methods include at least one of: (i) electronic assistance in completing chargeback assessments in a shorter timeframe; (ii) electronic improvements in detection of fraudulent charges disputes in a multi-party payment card processing system; (iii) electronic storage and management of delivery data to reduce time and effort by agents of the multi-party payment card processing system in responding to chargebacks; (iv) electronic review and recommendations facilitating faster decisions whether to dispute chargebacks in the multi-party payment card processing system; (v) elimination of electronic vulnerabilities to fraud and financial loss in automated chargeback process in a multi-party payment card processing system; (vi) electronic assessment and confirmation to distinguish non-fraudulent charge disputes from fraudulent disputes in the chargeback process of a multi-party payment card processing system; (vii) electronic assessment and confirmation to distinguish different types of fraud in disputed charges in the multi-party payment system; (viii) electronic evidence review of disputed charges and communication of information to a cardholder that may avoid disputed charges in case of friendly fraud; (ix) electronic evidence review of disputed charges and communication of information to a cardholder that may deter actual fraud; and (x) increased efficiencies in processing of chargebacks in a multi-party payment card processing system.

As will be appreciated, based on the description herein the technical improvement in the payment card system as described above is a computer-based solution to a technical deficiency or problem that is itself rooted in computer technology (i.e., the problem itself derives from the use of computer technology). More specifically, the technical problems and inefficiencies created by the conventional fraud detection and chargeback methods and systems within a payment card system are the result of implementation and use of computers in those fraud detection, chargeback, and payment card systems and related methods. The present invention improves upon the conventional methods and systems in the manners described herein. Thus, the inefficiencies or technical problems created by the conventional fraud detection and chargeback methods and systems within a payment card system as described herein are solved (i.e., the desired outcome of achieving increased efficiencies over the conventional fraud detection and chargeback methods and systems are achieved) by the methods and systems described and particularly claimed herein.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

Problems and challenges of existing multi-party payment card processing systems and associated chargeback processes are discussed below, followed by exemplary systems and methods that overcome such problems and challenges. The methods and systems described below overcome such difficulties and beneficially allow more efficient chargeback dispute decisions and resolution using evidence of delivery that is electronically retrieved by the system, while avoiding losses attributable to friendly fraud and malicious parties that may otherwise manipulate chargeback processes and fraudulent acquire goods from a merchant in a CNP transaction.

FIG. 1 is a schematic diagram illustrating an exemplary multi-party payment card processing system 100 for processing and disputing payment card transactions. The present system and method relates to payment card processing system 100, such as a credit card payment network using the MasterCard® payment processor 106. MasterCard® payment processor 106 is a proprietary communications standard promulgated by MasterCard International Incorporated® for the exchange of financial transaction data between financial institutions that are registered with MasterCard International Incorporated®. (MasterCard is a registered trademark of MasterCard International Incorporated located in Purchase, N.Y.).

In payment card processing system 100, a financial institution, such as an issuing bank 104, issues a payment card, such as a credit card account or a debit card account, to a cardholder 102, who uses the payment card to tender payment for a purchase from a merchant 110. To accept payment with the payment card, merchant 110 must normally establish an account with a financial institution that is part of the financial payment system. This financial institution is usually called the "merchant bank" or the "acquiring bank" or simply "acquirer". When a cardholder 102 tenders payment for a purchase with a payment card (also known as a financial transaction card), merchant 110 requests authorization from merchant bank 108 for the amount of the purchase. The request may be performed over the telephone or via a website, but is oftentimes performed through the use of a point-of-sale terminal, which reads the cardholder's account information from the magnetic stripe on the payment card and communicates electronically with the transaction processing computers of merchant bank 108. Alternatively, merchant bank 108 may authorize a third party to perform transaction processing on its behalf. In this case, the point-of-sale terminal will be configured to communicate with the third party. Such a third party is usually called a "merchant processor" or an "acquiring processor."

Using payment processor 106, the computers of merchant bank 108 or the merchant processor will communicate with the computers of issuing bank 104 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by MasterCard International Incorporated®, an authorization code, and/or other transaction identifiers that may be used to identify the transaction.

The payment network may be configured to process authorization messages, such as ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

During the authorization process of the payment card processing system, the clearing process is also taking place. During the clearing process, merchant bank 108 provides issuing bank 104 with information relating to the sale. No money is exchanged during clearing. Clearing (also referred to as "first presentment") involves the exchange of data required to identify the cardholder's account 112 such as the account number, expiration date, billing address, amount of the sale, and/or other transaction identifiers that may be used to identify the transaction. Along with this data, banks in the United States also include a bank network reference number, such as the Banknet Reference Number used by MasterCard International Incorporated®, which identifies that specific transaction. When the issuing bank 104 receives this data, it posts the amount of sale as a draw against the available credit in the cardholder account 112 and prepares to send payment to the merchant bank 108.

When a request for authorization is accepted, the available credit line or available account balance of cardholder's account 112 is decreased. Normally, a charge is not posted immediately to a cardholder's account 112 because bankcard associations, such as MasterCard International Incorporated®, have promulgated rules that do not allow a merchant to charge, or "capture," a transaction until goods are shipped or services are delivered. When a merchant 110 ships or delivers the goods or services, merchant 110 captures the transaction by, for example, appropriate data entry procedures on the point-of-sale terminal. If a cardholder 102 cancels a transaction before it is captured, a "void" is generated. If a cardholder 102 returns goods after the transaction has been captured, a "credit" is generated.

After a transaction is captured, the transaction is settled between merchant 110, merchant bank 108, and issuing bank 104. Settlement refers to the transfer of financial data or funds between the merchant's account, merchant bank 108, and issuing bank 104 related to the transaction. Usually, transactions are captured and accumulated into a "batch," which is settled as a group.

As explained in detail below, for CNP transactions that do not involve a physically presented card at a point-of-sale terminal and in-person delivery of purchased goods at the point of sale, charges may rather easily be disputed, whether maliciously or unmaliciously, on the ground that the cardholder did not make the charges, or that the purchased goods relating to charges made were not actually delivered by a shipper, carrier or delivery service after the transaction was made. Such disputed charges will trigger chargebacks in the payment processing system as described below, and typically the parties to the payment system will have difficulty proving that the cardholder actually made the transaction or confirming whether or not the goods actually were delivered and/or gathering evidence to dispute a chargeback in the payment processing system. Instances of friendly fraud in charge disputes by cardholders cannot easily be detected, and the system is also vulnerable to actual fraud and manipulation via false claims of non-delivery of purchased goods.

Figure 2:
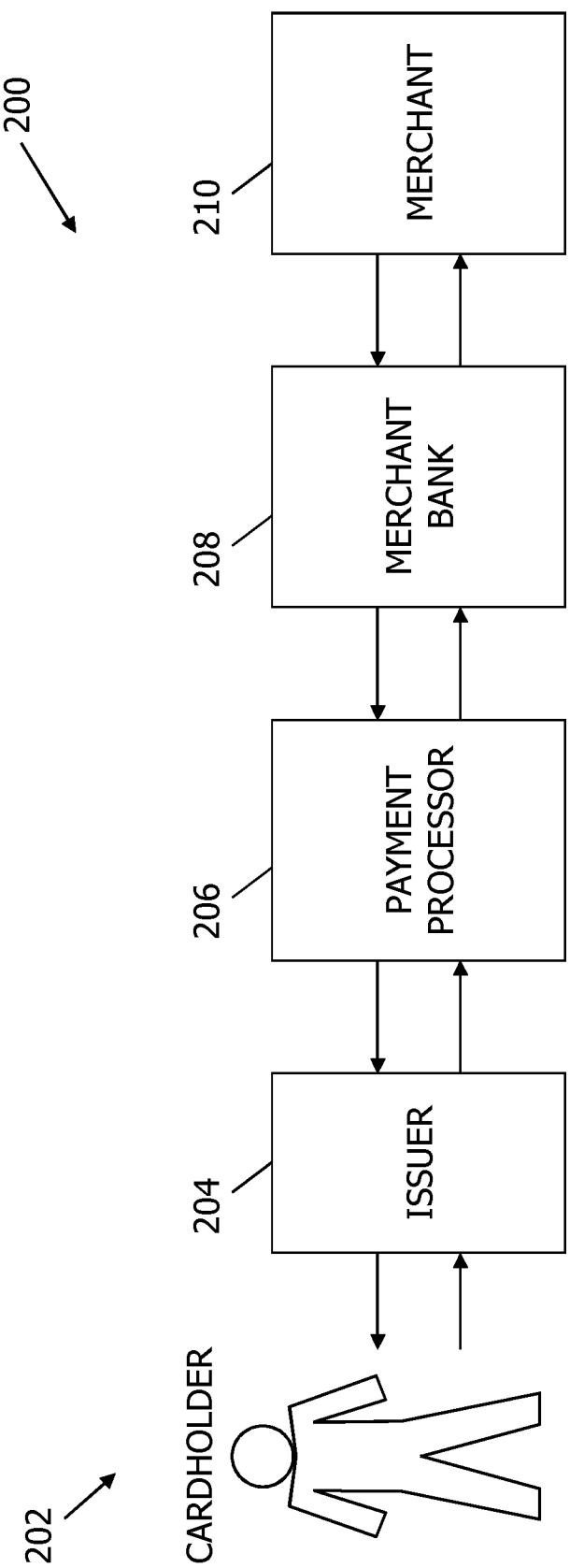
FIG. 2 is a schematic diagram illustrating an exemplary multi-party network system for processing payment card chargebacks.

FIG. 2 is a schematic diagram illustrating an exemplary multi-party network system 200 for processing payment card chargebacks. In one embodiment, system 200 is similar to or the same as system 100 as shown in FIG. 1. In some cases, cardholder 202 disputes a transaction that may have been carried out using payment card processing system 200. A transaction dispute may occur for technical reasons such as insufficient funds, clerical reasons such as duplicate billing and/or incorrect amount billed, quality reasons such as when a cardholder claims to have never received the goods as promised, and/or fraud reasons where a cardholder did not authorize the purchase. A transaction dispute may become a chargeback, and the system of the invention has a particular focus toward friendly fraud detection and/or aspects of alleged non-delivery of goods purchased with a payment card in a CNP transaction.

To initiate a chargeback, cardholder 202 may contact issuing bank 204 to dispute a transaction. Issuing bank 204 submits a chargeback transaction to payment processor 206, which provides clearing and settlement services to its registered users. Payment processor 206 may be the same or similar to the payment processor 106 described in FIG. 1. Payment processor 206 submits the chargeback to merchant bank 208. Merchant bank 208 either resolves the dispute or forwards it to merchant 210. Merchant 210 either accepts the chargeback or re-presents it back to merchant bank 208. If merchant 210 accepts the chargeback, merchant bank 208 forwards the response back to payment processor 206. Payment processor 206 then settles the chargeback with issuing bank 204. If merchant 210 re-presents the chargeback, merchant bank 208 rejects the chargeback requested by issuing bank 204. Merchant bank 208 may provide additional proof or documentation that the transaction was valid. Based on the second presentment, issuing bank 204 either accepts it and takes no further action, or rejects the second presentment, which is a stage referred to as arbitration chargeback. Once arbitration chargeback occurs, neither issuing bank 204 nor merchant bank 208 may initiate any additional chargebacks or presentments. At this point, a case filing is automatically generated with payment processor 206, which issues a financial liability decision regarding the chargeback.

Generally speaking, the chargeback process is complicated, time consuming, and/or costly to all participants involved. Each chargeback transmitted through the payment processor and over the payment network consumes network resources and bandwidth. It would be desirable to streamline or automate aspects of the chargeback process in order to more efficiently decide whether to dispute chargebacks and/or more efficiently resolve chargeback disputes.

One might be surprised at the difficulties sometimes presented at the merchant level or the merchant bank level to document actual delivery of goods shipped to a designated location using a carrier, shipping service, or delivery service. In general, in a CNP transaction a cardholder can request shipment of goods to any location desired, and merchants may use a variety of different carriers, shippers or delivery services, sometimes at the option of the cardholder. When a transaction involves multiple items, they may or may not be shipped at the same time and may or may not involve the same carrier or delivery service. Keeping track of which delivery service was used for which items in a single transaction, let alone a plurality of transactions, can present logistical issues and difficulty, if not inability, to efficiently locate pertinent delivery records for a specific transaction. The costs associated with locating a paper trail to prove delivery of goods relating to given transactions may quickly rival or exceed the amount of the disputed charges. Merchants and merchant banks may therefore rationally decide not to even try to establish proof of delivery due to the costs involved.

Also, different carriers, shippers or delivery services may employ different types of procedures and documentation regarding delivery of goods, some of which may be verified and some of which may not be verified. Records and documentation of actual delivery is not always provided back to merchants, however, in a manner that is timely and/or easily accessed for review in a chargeback scenario. Of course, human error and technology issues and incompatibilities of different systems used by the various carriers and merchants can obfuscate attempts to locate specific records. Regardless, absent evidentiary proof of delivery, chargebacks in the friendly fraud and non-delivery scenario can essentially be impossible to dispute with a likelihood of success.

In some cases if a certain level of authentication for a charge is made at the time of the initial transaction, liability may lie directly with the issuer bank. For example, if the merchant participates in implementing enhanced security authentication such as a 3-D Secure Cardholder Authentication Scheme wherein payment authentication and validation measures are distributed across the various parties involved in the transaction with the payment system, the issuer may be solely liable for any disputed charges. The issuing bank, however, is typically worse positioned than the merchant bank to evaluate whether or not the goods were actually delivered when charges are disputed. While the issuer bank may request records from the merchant (or merchant bank), for the reasons discussed above the merchant (or merchant bank) may or may not be able to easily provide them, and in cases wherein the merchant has no liability the merchant has little to no business motivation to incur any costs of investigating whether or not items were actually delivered.

In combination, the factors above present substantial weakness in the chargeback aspects of the system in the friendly fraud scenario, and also substantial vulnerability to malicious persons who may be aware of the difficulties of disputing chargebacks in certain scenarios. Illustrative examples of such weakness and vulnerability is described below.

Considering a simple case of "friendly" fraud in a CNP transaction, a cardholder may on occasion actually forget about a purchase made with a payment card, fail to recognize a charge made when it appears on the card account, or perhaps even inadvertently make a purchase without realizing it. As a result the cardholder may unmaliciously dispute a charge when it appears on the card account, and a resultant chargeback may result in a loss to the merchant bank or issuer, even though there may have been no actual problem with the charge insofar as the payment card processing system is concerned.

In the case of a delayed delivery because of a problem with a shipper, carrier or delivery service, the cardholder may reasonably, and unmaliciously, dispute a transaction charge only to have the item or goods delivered sometime later. The cardholder may or may not take this up with the issuer to resolve the mistake when delivery is made, and if not the merchant bank or issuer is likely to have to absorb the loss of a chargeback resulting from the disputed charge.

As another example of "friendly" fraud, consider a cardholder who happens to be a parent who may not realize that a teenager in the household purchased a pair of shoes online that was charged to the parent's card account using a computing device that included the appropriate information to complete a CNP transaction. When the purchase of the shoes appears on the payment card account, the parent may honestly and unmaliciously dispute the charge on the apparent belief that it was an unauthorized fraudulent charge. Depending on the timing of when the charge is seen and disputed, the shoes may have actually been delivered to the home and are in the teenager's possession, but without the parent/cardholder's knowledge or awareness. In this case, the merchant bank or the issuer bank may likely have to absorb the resultant chargeback from the disputed charge as neither one may not be able to collect evidence in a cost effective manner, if at all, that the goods (e.g., the shoes in this example) were properly ordered and authenticated as well as delivered to the cardholder's home. There was nothing improper, however, with the transaction or its processing on the payment processing system. The cardholder was simply confused at the time when the chargeback was initiated and unknowing or inadvertently disputed a charge that should not have been disputed. Such confusion may be likely when multiple persons are authorized card users, as can happen in a household or in a business environment.

In a scenario similar to the one above, suppose the parent and the teenager live in different homes. In this case, the shoes may have been shipped and delivered to the residence where the teenager lives, not where the parent/cardholder lives. As such, the parent/cardholder may be certain that the shoes were not delivered to the parent/cardholder's home and this may contribute to the parent/cardholder's belief that the charges are rightfully disputed. If the merchant bank or the issuer bank could locate a record showing delivery to the teenager's residence, the chargeback may be properly disputed and brought back to the cardholder, but for the reasons above this may not be practical or possible in conventional systems as either no such record may exist or be cost-effectively found.

In another scenario, a grandparent/cardholder may order a gift and have it shipped to a grandchild at another address. The charge for the gift may be disputed by the grandparent/cardholder on the belief that the gift was not actually delivered. The grandparent/cardholder may be correct on incorrect in holding such belief, but nonetheless may dispute the charge without malicious intent. If the merchant bank or the issuer bank could locate a record showing delivery to the grandchild's residence, the chargeback may be disputed and brought back to the cardholder, but for the reasons above this may not be practical or possible in conventional systems.

Yet another scenario is one where a cardholder makes a charge for goods that were actually delivered and received, but the cardholder disputes the charge anyway. For instance, and following the example above, a parent may order shoes for a teenager and after receiving them claim that the shoes were not ordered or delivered and dispute the charge. This is not actually a "friendly" fraud scenario as described above because the cardholder is now deceptively and maliciously disputing the charge. Such a scenario presents practically identical issues to those above, however, in that the merchant or issuer bank may not be able to provide any evidence of actual delivery to dispute the chargeback, and accordingly will have to absorb the loss.

More sinister scenarios are possible in which a cardholder may act in concert with another person to intentionally manipulate the chargeback system in order to avoid having to pay for purchased goods. As an example of this type, suppose a cardholder purchases a television and asks that it be shipped to an address other than the cardholder's actual address where a relative, friend, or cohort may live. After the television is delivered to the requested address, the cardholder may dispute the charge on the basis that it was not ordered by the card holder, was not delivered to the requested address, or was improperly shipped to an unrecognized address. The cardholder eventually receives the benefit of the chargeback, while the relative, friend or cohort may keep the television that was actually delivered to them or give to the cardholder. Absent some evidence of actual delivery, the merchant bank or issuer bank will be unable to dispute the chargeback and will likely absorb the loss.

Finally, scenarios such as those described above are contrasted with instances of a cardholder making a purchase in a CNP transaction in which the goods are truly not received or delivered. Such charges are rightfully disputed, but from the perspective of the payment system there is no way to distinguish this scenario from a friendly fraud scenario (in which the dispute is not malicious but is mistaken) or an actual fraud scenario (wherein the cardholder and another party are maliciously acting with fraudulent intent). If such instances of actual non-delivery could be confirmed and distinguished from friendly fraud and actual fraud, it may provide valuable insight and informational feedback to more efficiently optimize the payment processing system overall, process chargebacks specifically, more efficiently resolve chargeback disputes, and tangentially assess merchant and shipping/delivery performance issues to improve customer service to cardholders. Unfortunately, and for the reasons above, such instances cannot be confirmed in conventional payment systems because of difficulties in establishing a delivery (or non-delivery) of goods in CNP transactions.

In view of the above, conventional payment card processing systems and methods have yet to completely meet the needs of the marketplace in the chargeback aspects described and improvements are desired.

Figure 3:
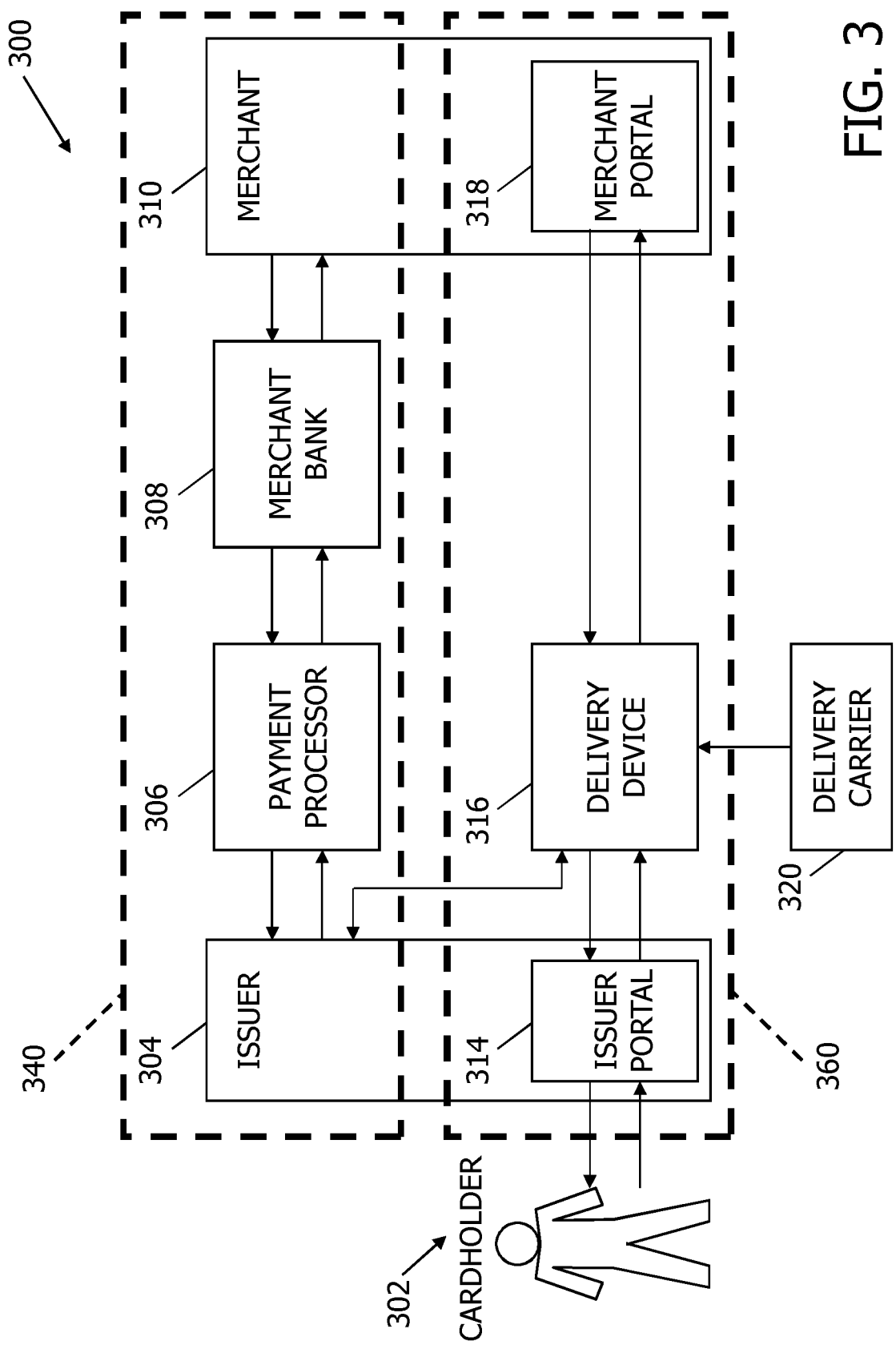
FIG. 3 is a schematic diagram illustrating an exemplary computer system that includes a delivery data computing device that facilitates friendly fraud detection capability.

FIG. 3 is a schematic diagram illustrating an exemplary multi-party network system 300 that includes a host delivery computing device 316 and a chargeback communication network 360 for designating and handling transaction disputes as chargebacks. Network system 300 includes a cardholder 302, an issuer 304, a payment processor 306, a merchant bank 308, a merchant 310, an issuer portal 314, the host delivery computing device 316, and a merchant portal 318.

A network 340 is part of a chargeback system that may be similar to the chargeback system 200 described with respect to FIG. 2. Network 360 may be used to resolve transaction disputes designated as chargebacks. Network 340 and network 360 are illustrated as two separate communication networks that are configured to run independently of one another, although they could be combined into one network in another embodiment as desired.

Cardholder 302, using a cardholder computing device, accesses issuer portal 314 to review a cardholder payment transaction history associated with a payment card. The transaction history includes one or more transactions made using the payment card. Cardholder 302 selects a transaction to dispute and transmits the dispute through issuer portal 314. Cardholder 302 may select a dispute button displayed on the user interface of issuer portal 314. As described above, the cardholder 302 may dispute the transaction in a friendly fraud manner without malicious intent, or with malicious intent on the basis that the transaction was not made by the cardholder and/or was not delivered. In either case, the propriety of the dispute may turn on evidence of delivery of the goods.

Issuer portal 314 receives the dispute, including cardholder dispute data. This dispute data also includes transaction data associated with the transaction being disputed. Issuer portal 314 transmits a corresponding dispute message, containing both the cardholder dispute data and associated transaction data, to the host delivery computing device 316. When the issuer receives the dispute, the chargeback process described above is initiated. One or both of the merchant bank 308 and the issuer 304 may investigate and if desired and evidence exists to dispute the chargeback may do so.

In one embodiment, host delivery computing device 316 accepts and stores delivery data that may be used to investigate chargebacks in combination with other transaction data. As such, the host delivery device may communicate with a delivery carrier device 320. While one delivery carrier device 320 is shown multiple delivery carrier devices 320 may be present that correspond to different carriers, shippers or delivery services. When delivery of goods are made to the requested shipping location of a transaction, which can be linked to transaction identifiers, the delivery carrier devices 320 generate and/or collect electronic delivery data. The electronic delivery data may in turn be communicated to or requested by the host delivery device 316, which may in turn communicate the delivery data directly or indirectly to the issuer bank 304 or the merchant bank 306 in order to facilitate a meaningful review of a chargeback and to decide Whether or not to dispute the chargeback.

Importantly, the delivery data in the context of the present specification is distinct from shipping data for purposes of this disclosure. Specifically, for purposes of the present description, delivery data refers to evidence or proof of delivery of goods to a location. In contrast, shipping data refers to the desired location where the delivery is to occur. It should be recognized that shipping data, on its own, does not confer any information regarding delivery. Shipping data typically includes a shipping address only, whereas delivery data relates to confirmed or verified delivery of goods at the shipping address or another address. In the context of a chargeback dispute, the shipping data alone is not conclusive to dispute a charge, whereas the delivery data can be conclusive evidence as further described below.

In various contemplated examples, the delivery data may vary and in some instances may depend on the specific carrier utilized to deliver the goods. The delivery data may include a delivery code or codes indicating the status of delivery (e.g., a first code for initial pickup of the purchased goods, a second code for purchased goods in transit between locations, a third code for delivery to the final address, etc.). Where applicable, the codes may also include indications whether or not a person acknowledged delivery of the goods at the final location. For example, if a person at the final location signed for the goods, this can be coded and as desired, linked to a digital representation of the signature. Additionally, delivery notes may be made regarding Whether or not anyone was present to accept the delivery and if so the name of the person, and where the delivery was actually made (e.g., curbside, front porch, side door, etc.). The delivery data may also include the delivery time and date and transaction identifiers to match delivery data to transactions and chargebacks on the payment system.

In different embodiments, the delivery carrier device 320 may communicate directly with the host delivery computing device 316 and/or directly with the merchant 310 as shown. In some cases the delivery carrier device 320 may only communicate with the merchant 310 with the host delivery device 316 obtaining the delivery data from the delivery device. The delivery device 316 may then communicate with the issuer 104, payment processor 306 and the merchant bank 308 and provide the delivery data for specific transactions in which chargebacks have been made.

Considering the examples discussed above that illustrate difficulties in conventional systems, the delivery data can quickly provide sound reasons to dispute chargebacks in a manner that conventionally has not been practical or efficiently located in a cost effective manner, and sometimes may not have been accomplished irrespective of the costs of obtaining records of proof of delivery.

In the case of simple friendly fraud, if the delivery data shows that delivery was made to the cardholder's address of record, this strongly indicates that the charge disputed is mistaken and accordingly that a chargeback can be disputed with a high chance of success. If the cardholder is presented with evidence of such delivery, it may jog their memory or otherwise cause them to reconsider whether to continue the dispute. This is particularly so if the disputed charge was also authenticated and authorized by multiple parties when the transaction was initially made. If the merchant or issuer bank has strong evidence that the cardholder actually made the purchase and that the purchase was delivered, as indicated by the delivery data, the chargeback may be cancelled or reversed in the payment card processing system and associated losses may be avoided.

In the example of a teenager in the household who purchased a pair of shoes unbeknownst to the parent/cardholder, if the delivery data shows delivery of the shoes to either the address of the cardholder or the address where the teenager lives that would quickly recognized to the cardholder, presenting such evidence to the cardholder may cause the cardholder to question whether to continue the dispute. This may be especially so when the delivery data is detailed and shows that the shoes were delivered to the requested address in the transaction at a specific time and date and was accepted by (or signed by) a person whose name corresponds to another member of the household and perhaps even to the teenager.

In the example of a grandparent/cardholder who ordered a gift and had it shipped to a grandchild at another address, the delivery data may indicate delivery with time, date, and possibly a person who accepted the delivery at the requested address when the transaction was made. As such, a chargeback may be disputed by the merchant bank or issuer bank and when brought the attention of the grandparent/cardholder, the dispute may be dropped.

In a scenario where a cardholder disputes a charge on the basis that they were not ordered by the cardholder or delivered to the cardholder, the delivery data may show the dispute to be based on false premises. The chargeback may be disputed by the merchant bank or issuer bank with a likelihood of success.

In the scenario in which a cardholder attempts to act in concert with another person to intentionally manipulate the chargeback system in order to avoid having to pay for purchased goods, the delivery data may show the that the goods were delivered to the address requested by the cardholder at the time of the transaction. The chargeback may accordingly be disputed by the merchant bank or issuer bank with a likelihood of success, and when such information is presented to the cardholder it may deter this type of attempted fraudulent manipulation of the system in the future.

In a contrasting scenario wherein a cardholder truly has not received delivery of the goods, the delivery data, or lack thereof, may corroborate the cardholder's position. The merchant bank or issuer bank may accordingly choose not to dispute the chargeback as it is probably unlikely to succeed.

As illustrated by the examples above, the delivery data made available by the host delivery device 316 facilitates more or less automated review and decision making whether or not to dispute chargebacks by a merchant bank or issuer bank. Alerts, messages and notifications can be made in the system to any interested party regarding instances of friendly fraud, suspected fraud, or delivery problems in fulfilling transactions. Alerts, messages and notifications can likewise be automatically generated to representatives of the merchant bank or issuer bank with a recommendation whether or not to dispute a chargeback with supporting evidence or explanation for review by the representatives. The representatives may be given an option to proceed with a dispute (or not) based on the feedback provided by the system that considers electronic delivery data.

Alerts, messages and notifications can likewise be automatically generated to cardholders regarding evidence that may confirm or contradict the dispute of charges. The cardholder may be given an option to proceed with a dispute (or not) based on the feedback provided that considers delivery data.

Figure 4:
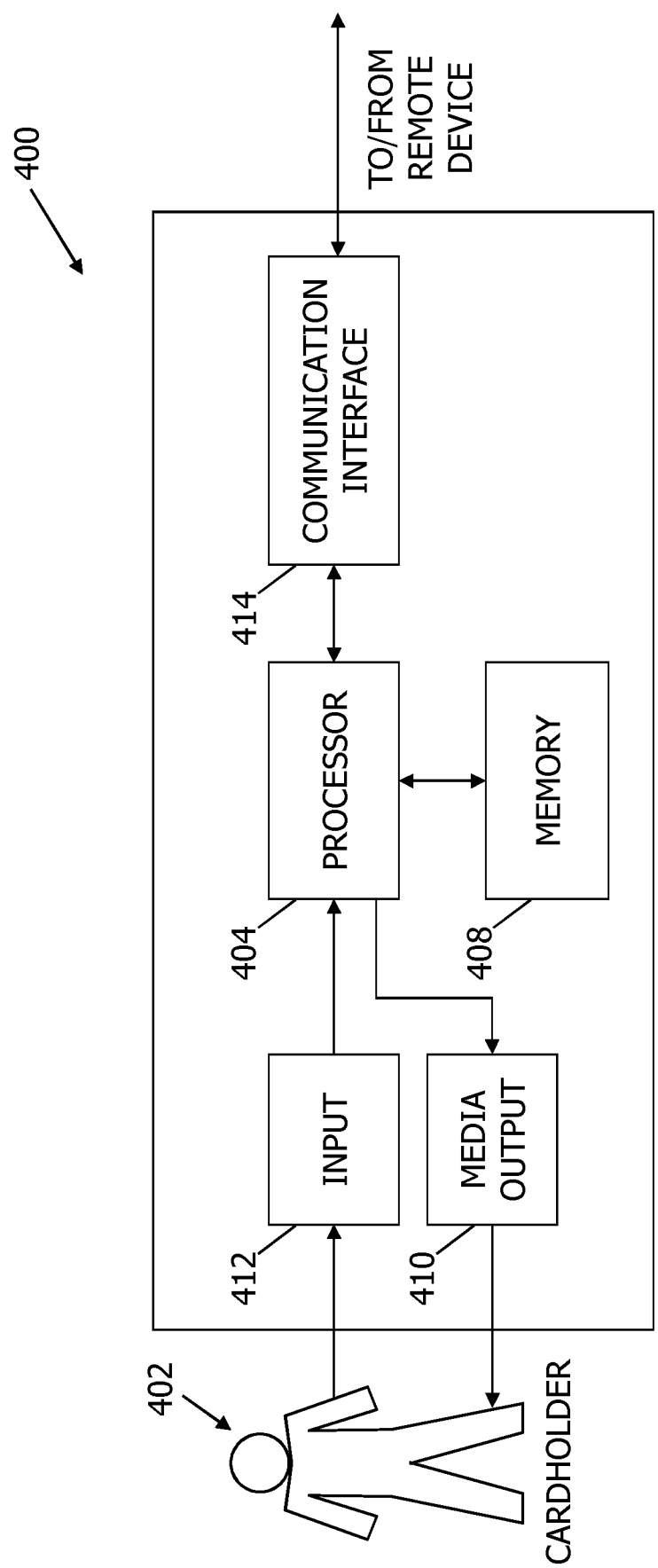
FIG. 4 illustrates an example configuration of a user device for the system shown in FIGS. 1-3.

FIG. 4 illustrates an example configuration of a device 400 operated by a user 402, such as any of the parties described above in the payment network or a cardholder. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by cardholders, representatives of the issuer, representatives of the payment processor, representatives of the merchant bank, representatives of the merchant, and representatives of the delivery carrier to effect the system as shown in FIG. 3. Additional and/or alternative users and user devices may be provided, however, as desired for use with the system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
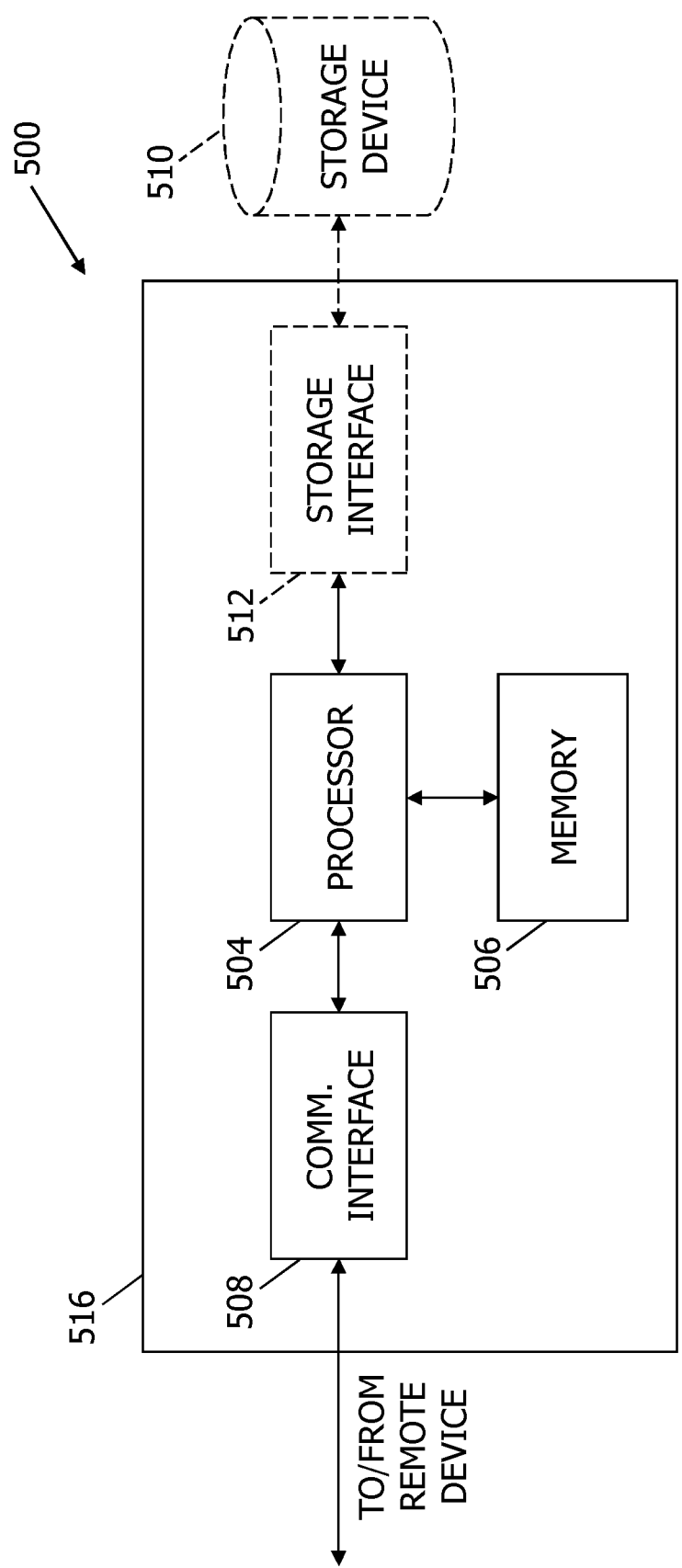
FIG. 5 is a schematic diagram of an example server computing device that may be used with the computer system shown in FIG. 3.

FIG. 5 illustrates an example configuration 500 of a delivery computing device 516 as shown in FIG. 3 that confers friendly fraud detection capability and greatly simplifies chargeback dispute decisions and efficiency in resolving chargeback disputes in a dramatically reduced timeframe with substantially improved likelihood of success. The computing device 516 is sometimes referred to herein as a server-based network "host" device that includes and considers delivery information in assessing potential chargeback disputes, although it is not strictly necessary in all embodiments that the host computing device is a server system.

As shown in FIG. 5, the host delivery computing device 516 includes a processor 504 for executing instructions. Instructions may be stored in a memory area 506, for example. Processor 504 may include one or more processing units (e.g., in a multi-core configuration).

Processor 504 is operatively coupled to a communication interface 508 such that host delivery computing device 516 is capable of communicating with a remote device such as a merchant portal, an issuing portal, a delivery carrier portal, or a payment processor. For example, communication interface 508 may receive or transmit transaction data, related delivery data, chargeback data and chargeback dispute data to the merchant portal and/or another client device via a network. In some cases the communication interface 508 may also directly communicate with a user device of customer and provide chargeback dispute information, chargeback status information, and/or delivery data and information for the user to decide whether the charges are properly disputed.

Processor 504 may also be operatively coupled to a storage device 510. Storage device 510 is any computer-operated hardware suitable for storing and/or retrieving data. In some embodiments, storage device 510 is integrated in host delivery computing device 516. For example, host delivery computing device 516 may include one or more hard disk drives as storage device 510. In other embodiments, storage device 510 is external to host delivery computing device 516 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled cardholders. In one embodiment, the database is centralized and stored on the server system 500. In an alternative embodiment, the database is stored remotely from the server system 500 and may be non-centralized. The database may store transaction data including data relating to merchants, merchant locations, cardholders, and delivery carriers. The database may include delivery data that is linked to transaction data for ease of access, retrieval and review when considering a possible chargeback dispute in the card payment network. The database may include a plurality of files of information for enrolled cardholders, as well as recorded data regarding disputed charges, disputed chargebacks, success and failure rates of disputes and chargebacks, possible friendly fraud and actual fraud events, as well as non-delivery data and delivery carrier performance data.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
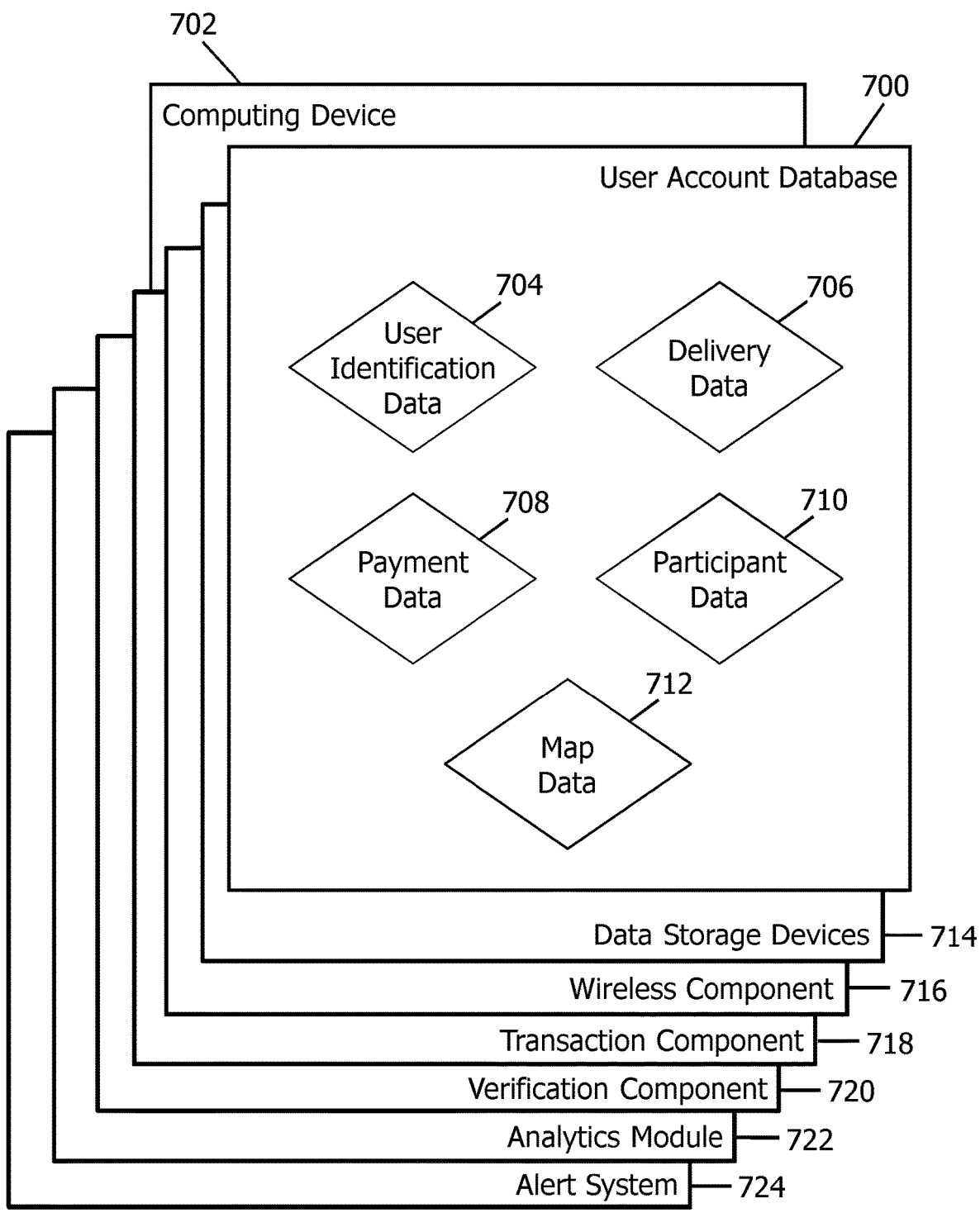
FIG. 6 shows an example configuration of a user account database within a computing device, along with other related computing components, that may be used to create, organize, and monitor a plurality of user data associated with a user.

FIG. 6 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, delivery data 706, payment data 708, registration data 710, and map data 712. In contemplated embodiments, user identification data 704 includes, but is not limited to, a user name, a user address, and a user phone number. Delivery data 706 includes data associated with delivery of goods by a delivery carrier as described above. Payment data 708 includes, but is not limited to, card information, payment history, and a billing address. Registration data 710 includes information associated with participating merchants, including merchant identifiers, address information, contact information, etc. Map data 712 includes data associated with third party information (e.g., system administrators).

Computing device 702 includes the database 700, as well as data storage devices 714. Computing device 702 also includes a wireless component 716 and a transaction component 718 for correlating, for example, payment card transactions. An analytics module 722 is included for analyzing transactions, enrollment status, the delivery data and chargeback analysis and dispute date described above, time to complete chargeback disputes, success or failure data of chargeback disputes, and other items of interest. Further included is a verification module 720 that may communicate with a device in the payment network or another device, and an alert module 724 for transmitting an alert to a cardholder, merchant or an issuer, or to any other interested party so that possible fraudulent activity may be timely investigated and resolved.

FIG. 7 shows an exemplary process 800 of chargeback dispute and associated friendly fraud detection for the payment card processing system shown in FIGS. 1-6.

At step 802, the system processes payment card transactions as described above in relation to FIG. 1. Authorizations for payment card transactions may be made or denied at step 802 according to conventional practices. The transactions processed at step 802 may or may not involve enhanced security authentication measures such as a 3-D Secure Cardholder Authentication scheme discussed above. The transactions processed at step 802 may also include CNP transactions and other transactions involving physical presentation of payment cards. The processing of transactions at step 802 includes a conventional generation of an authorization message for each approved transaction. The authorization message includes transaction data for the approved transaction and is stored on the system for future reference.

At step 804, delivery data for items or goods associated with the payment card transactions processed at step 802 is collected and obtained by or communicated to the issuer bank, for example. As described above the delivery data may be directly or indirectly provided to the issuer by a delivery carrier device 320 (FIG. 3) and/or the host delivery device 316. Once collected, the delivery data may be utilized to augment an authorization message as shown at step 806 to include the delivery data.

For purposes of step 804, in one exemplary embodiment, the authorization message generated from step 802 is modified such as by adding or completing a field in the message to indicate delivery status. Delivery codes such as those described above may be added to the authorization message so that the augmented authorization message now includes delivery information that can be directly retrieved and referenced from the augmented message if the transaction is subsequently disputed and a chargeback is issued. The augmented authorization message provides quick electronic access of transaction data, authentication data, and delivery data to assess a possible chargeback dispute. Delivery codes in the augmented message may, in turn, be linked to more detailed delivery information stored on the system for further review as desired.

In exemplary embodiments, multiple codes may be added to an authorization message in step 806, or populated into predetermined and pre-existing message fields, as desired. For example, a first message field may be provided or populated to include a delivery carrier identifier, a second message field may be added or populated to include a delivery status code, and a third message field may be added or populated to include a confirmation code. When a plurality of codes are utilized, delivery data may be concisely captured in a layered format in the augmented authorization message having as many message fields as desired to convey needed information to assess a chargeback dispute.

As an example coded message fields to capture delivery data, in the numeric sequence 01131510031702 the delivery data may be recognized and interpreted as indicating delivery by carrier 01 (e.g., FedEx) in the first message field at time 13:15 (i.e., 1:15 pm) in the second message field on 100317 (i.e., Mar. 10, 2017) in the third message field with status 02 (verified receipt via signature) in the fourth message field. Such coded delivery data may be added to the end of the authorization message for the associated transaction. If the goods of any particular transaction are divided over different shipments at different times for delivery, a second coded delivery sequence could be added to a previously augmented message to represent a second delivery of goods.

Such delivery codes may be provided directly from a carrier or the host delivery device at step 804 or may be derived from data and information supplied by a carrier. Since each delivery carrier has its own identifier, the system easily distinguishes goods delivered by different carriers. While example codes are descried above, other codes may alternatively be provided in relation to fewer, additional or alternative data fields and representations in various different implementations.

Recognizing that delivery of goods for any given transaction will occur sometime after the transaction is first processed at step 802 and that the necessary delivery steps take some time to complete, the augmentation at step 806 may occur sequentially over time as delivery data is collected. Following the example above, the sequence 01131510031702 may change and be augmented over time with the carrier code 01 (e.g., FedEx) appearing first when the item is provided for delivery by the assigned carrier, and the delivery time and date of 13:15 (i.e., 1:15 pm) and 100317 (i.e., Mar. 10, 2017) and status 02 (verified receipt via signature) appearing later proximate the time of actual delivery or sometime later. As such, the delivery data may initially read 01 only or 01000000000000 before the delivery time, delivery data and confirmation status are known, and as such this may be recognized as indicating that the goods are still in possession of the carrier 01 (e.g., FedEx) but not yet delivered. Once the goods are delivered and the delivery data is collected on the system, the delivery data is changed to 01131510031702 to convey the delivery time, delivery data and confirmation status. Likewise an authorization message that does not include the delivery data fields or that is not populated with delivery codes indicates that the goods have not been shipped for delivery and have not even been received by a carrier.

The augmented authentication data is stored at step 808 for later retrieval and reference by the system. Since the authorization message previously generated via the processing step 802 includes transaction information (e.g., the card primary account number (PAN) and transaction id number, and authentication data) the augmented authorization message that now includes delivery data can serve as proof of both valid authentication of the transaction at the time that it was made and proof of delivery (or unconfirmed delivery) of the related goods to quickly review disputed charges, assess chargebacks, and identify different types of possible fraud.

In addition to or in lieu of steps 804, 806 and 808, delivery data may alternatively be obtained by or communicated to a merchant or a merchant bank as shown at step 810. The delivery data may be coded as in the examples above or formatted in any manner desired, and at step 812 the merchant or merchant bank links the delivery data to its related payment card transaction. For example, the delivery code may be stored in a linked relation to a PAN of the card that was used to purchase it, or may be linked to a transaction id used by the merchant in the initial processing of the transaction at step 802. The linked delivery data is then stored at step 814 for later retrieval and reference by the system to quickly review disputed charges, assess chargebacks, and identify different types of possible fraud.

When both the steps 804, 806 and 808 and the steps 810, 812 and 814 are performed, both issuers and merchants and their merchant banks have easily retrievable information on the system concerning transactions made and related delivery of goods. As such, in instances wherein the merchant or merchant bank has liability for a chargeback, the merchant or merchant bank can review its own information on the system without having to request information from other parties. Likewise, in instances wherein the issuer has liability for a chargeback, the issuer can review its own information on the system. It is recognized, however, that since the host delivery device described above can provide information to any of the parties to the payment network, the system may perform one or the other, but not both, of the processes represented by the steps 804, 806 and 808 and the steps 810, 812 and 814. The host delivery device can provide the same or different levels of information to issuers, merchants, and merchant banks via respective user portals.

At step 816, the system receives a disputed charge made by a cardholder through a cardholder portal as described above. Upon receipt, the disputed charge starts the chargeback process as shown at step 818. Depending on the nature of the authentication made to the originally processed payment card transaction at step 802, either the issuer or the merchant and merchant bank have liability, and the party having liability has the option to dispute the chargeback and avoid a related financial loss as described above.

To facilitate the review process and decide whether to dispute the chargeback from step 818, at step 820 the system retrieves and reviews the delivery data relating to the disputed transaction that is stored at step 808 and/or 814. Based on this review, the system can analyze the retrieved delivery data and other transaction data to determine whether or not there is legitimate basis for the dispute based on the available evidence stored on the system. That is, the system may evaluate or assess the disputed charge to determine whether it has a legitimate basis that is corroborated by data and information on the system (including but not limited to the delivery data) or a questionable basis in which the dispute of the charge is questionable, if not illegitimate, based on data and information on the system (including but not limited to the delivery data).

Based on the retrieval and review at step 820 to evaluate the disputed charge, the system may generate a recommendation for a chargeback dispute at step 822, for example, when the delivery data shows that proof of delivery of the goods for the transaction as previously authenticated by the system exists and as such there is a questionable basis for the disputed charge. The system may provide an option for a representative of the issuer, merchant or merchant bank to proceed with the dispute based on the generated recommendation, and if approved by the representative the system can proceed to electronically initiate the chargeback dispute as shown at step 824 with supporting data and information regarding transaction authentication and the proof of delivery of goods for the transaction.

Alternatively to step 822, the system may directly communicate with the cardholder as shown at step 826 and supply authentication and delivery information that cast doubt on a legitimate basis for disputed charge. The system may also request confirmation whether the cardholder still wishes to proceed with the dispute. In contemplated examples, such communication may occur over the cardholder portal, via email or SMS text message, or via a push notification to a cardholder user device. Such communication may jog the cardholder's memory in the case of friendly fraud, cause the cardholder to reconsider whether the charges should be disputed by giving them some assurance that that the charges are valid, or cause the cardholder to withdraw from actual fraudulent activity as the request for confirmation may be taken as questioning a legitimacy of the cardholder's dispute of the charge. If the user decides to continue the dispute, the system can proceed to electronically initiate the chargeback dispute as shown at step 828 with supporting data and information regarding transaction authentication and the proof of delivery as shown at step 828.

If the user decides to discontinue the dispute in response to the communication from step 826, the system can cancel the chargeback at step 830 and revoke any credit issued to the cardholder. In some cases, the review and communication shown at steps 820 and 826 may occur before the chargeback process is initiated and avoid any need to cancel the chargeback if the user opts to discontinue it. In other words, such processes could serve to avoid a chargeback from ever being issued. The review and recommendation could made to an issuer, merchant, and merchant bank first who may then approve communication to the cardholder, who may be notified that initial review indicates that the disputed charge may be made in error according to available records.

If the review of delivery data at step 820 shows that delivery of goods has not occurred or not been confirmed, the system can hold any recommendation to dispute the charge at step 822 or hold any communication with the cardholder at step 826 pending further review or to allow further time for goods to be delivered in the case that they are temporarily lost or delayed in the delivery process.

Alternatively, the system may know or deduce from the delivery data that the goods have not been delivered and at step 832 may confirm the goods as non-delivered and accept the chargeback at step 834. For example, the delivery data may indicate that the goods were not even assigned to a carrier for shipment (and therefore likely were not shipped), that the goods were delivered to an address that does not match the transaction data, or that the goods delivered do not match the transaction data. As such, the delivery data can in some cases corroborate the cardholder's dispute of the charge. In such cases, the chargeback should not be disputed as the data does indicate a problem with the disputed transaction. As such, the system may confirm a legitimate basis for the disputed charge and the chargeback can be accepted without further question or investigation.

If a chargeback dispute is initiated from either step 828 or 824, the system may generate a fraud alert as shown at step 836. As the evidence shows that the transaction was properly authenticated and that the purchased goods were properly delivered, the dispute of the charge may be flagged and suspected to be possibly fraudulent. The fraud alert can be issued to one or more of the issuer, the merchant, the merchant bank or the payment processor for review and investigation. The notification may be made via a user portal, email, SMS text message, or push notification configured to activate a user device and present information. The notification may include an option or options for the user to respond directly from the notification.

The system may proceed to analyze the charge at step 838 to determine if it likely is fraudulently disputed. If, for example, the disputed charge was properly authenticated and delivered to the cardholder's address of record as shown by the delivery data, the charge can be deemed a likely case of friendly fraud. In some cases wherein the disputed charges are below a certain threshold and when the charge dispute is made by a cardholder with a positive history (i.e., good payment history with no previous charge disputes or infrequent disputes, or previously disputed charges that were deemed to be valid) the friendly fraud finding may simply be recorded without further action taken at the option of the party liable for the chargeback. That is, some tolerance of friendly fraud as identified by the system may be possible. If friendly fraud has indeed occurred and there is no malicious intent by the cardholder in disputing the charge, a party liable for the chargeback may choose to accept a small loss of a chargeback rather than to risk a loss of goodwill to a good cardholder by disputing the chargeback. On the other hand, the party liable for the chargeback may rightly dispute it even if the charge is relatively small and the customer has a positive history, because the evidence it needs to do so is available from the system. Thus, it can lodge a chargeback dispute with minimal cost with a good chance of success and attempt to reduce (or recoup) all losses attributable to friendly fraud scenarios.

On the other hand, if a given cardholder has a history of disputing charges that are deemed to fall into the friendly fraud scenario, this can be flagged for the party liable for the chargeback for possible intervention, including initiation of a chargeback dispute or referral of the cardholder to authorities if a pattern of friendly fraud charges points to a conclusion that the cardholder may not be disputing charges unmaliciously. To deter problematic charge dispute behavior, issuers, merchant banks, or merchants may set flags on the system for cardholders that seem to dispute charges too frequently. For example, and for purposes of the system, it may be decided that a cardholder may dispute up to three charges a year without particular scrutiny when the charges are below a predetermined threshold amount, but once the threshold is met further disputes will be scrutinized and perhaps referred for investigation outside of the system.

At step 842, the system may deem that the disputed charge is actually fraudulent. This can turn on the amount of the charges at issue, the particular type of item(s) involved in disputed transactions, a history of transactions being sent addresses that are the cardholder's address on file that may rouse suspicion, a cardholder history of disputing charges, or authentication problems, issues and flags generated in initial processing of the transaction at step 802 but that did not result in denial of the transaction when it was made.

The system can operate with improved intelligence over time as data relating to disputed charges and evaluations are made on the system and recorded for further reference in reviewing any transaction for possible fraud. For instance, the system may detect series of disputed transactions involving shipments to the same address that does not correspond to the cardholder's address, and may even take such information into account in initially approving or denying transactions in which shipment of goods is requested to that address. As another example, the system may detect a series of disputed charges that relate to the same purchased goods or the same merchant, and take this into account in initially approving or denying transactions involving certain goods and certain merchants. As such, the system may over time intelligently start to block certain transactions from being approved based on charge event disputes and outcomes previously performed by the system.

At step 844 the system may deem the dispute of charges as not fraudulent either because the review is inconclusive or because there is a problem or error in the transaction from either an authentication or delivery perspective. This finding may relate to the non-delivery confirmation described above for step 832. Additionally, in cases where both steps 804, 806, 808 and 810, 812, 814 are performed the system can compare delivery data from the two processes and see if they match. If they do not match, an error condition can be flagged for possible investigation. For example, if the augmented authorization message stored at step 808 includes delivery information that conflicts with the delivery data stored at step 814 (e.g., different carriers are identified, different delivery days are indicated, or one of them indicates delivery while the other does not), the integrity of the delivery data is called into question. On the other hand, if the augmented authorization message stored at step 808 includes delivery information that matches the delivery data stored at step 814 assurance is provided that the data is correct.

The processed described can be completed effortlessly and almost instantly when the delivery data exists on the system at the time of receipt of a disputed charge. Informed decisions to dispute or not dispute charges, or to dispute or not dispute chargebacks, can be made without lengthy human investigation and consultation with various different parties to the payment system to try and locate information and evidence for a possible chargeback dispute. Fraud, whether friendly fraud or actual fraud, is much more likely to be detected and when possible, interrupted. Detailed archiving of system performance, disputed charge resolution, chargeback dispute decisions and resolution, and assessment of charges as fraudulent or not provides valuable insights into cardholder behavior in disputing charges, as well as greatly simplifies chargeback acceptance and dispute resolution. Financial losses to the issuer, merchant bank and/or merchants is accordingly reduced via reduced instances of friendly fraud and actual fraud that are not detected, and system feedback to cardholders may deter attempts to manipulate chargeback processes altogether. The data stored on the system may also provide valuable insight regarding the performance of particular merchants and carriers in timely delivering goods to ensure that customer experiences are optimized and issues are being addressed.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A host computing device in communication with an electronic payment card processing system, wherein the electronic payment card processing system includes a multi-party payment processing system and network that processes payment card transactions and clears and settles authorized payment card transactions, the host computing device comprising a processor in communication with a memory, the memory storing executable instructions that, when executed by the processor, cause the processor to perform the steps of:
   receiving, at a first time, a first carrier code of a plurality of carrier codes from a delivery carrier, the first carrier code comprising a value representing a delivery carrier entity of the delivery carrier in possession of a purchased item associated with a payment card transaction that was previously approved through the multi-party payment processing system, wherein the first time is after a time at which the payment card transaction was previously approved and after possession of the purchased item by the delivery carrier;
   in response to receiving the first carrier code, retrieving an authorization message associated with the payment card transaction, wherein the authorization message is in a format of an ISO 8583 or an ISO 20022 network message;
   generating a first-modified authorization message by modifying the authorization message with the first carrier code, wherein the generating the first-modified authorization message further comprises formatting the first-modified authorization message in the format of the ISO 8583 or ISO 20022 network message;
storing the first-modified authorization message;
receiving, at a second time, a second carrier code of the plurality of carrier codes from the delivery carrier, the second carrier code comprising a value representing at least one of (i) a delivery time and date and (ii) a delivery status of the purchased item, wherein the second time is after the first time and after delivery of the purchased item;
in response to receiving the second carrier code, retrieving the first-modified authorization message;
generating a second-modified authorization message by modifying the first-modified authorization message with the second carrier code, wherein the generating the second-modified authorization message further comprises formatting the second-modified authorization message in the format of the ISO 8583 or ISO 20022 network message;
storing the second-modified authorization message;
receiving, at a third time, at least one disputed charge for the purchased item associated with the payment card transaction, wherein the at least one disputed charge is initiated by a cardholder of the payment card transaction for a chargeback process, wherein the third time is after the second time and after initiation of the disputed charge by the cardholder;
in response to receiving the at least one disputed charge, retrieving the second-modified authorization message; and
based on the retrieved second-modified authorization message, determining that the at least one disputed charge is friendly fraud by analyzing delivery data of the purchased item, wherein the analyzing the delivery data further comprises analyzing the first and second carrier codes of the second-modified authorization message.

2. The host computing device of claim 1, wherein the executable instructions, when executed by the processor, further cause the processor to perform the step of:
accepting delivery data for a plurality of purchased items associated with a plurality of payment card transactions that were previously approved through the multi-party payment processing system from at least one of a delivery carrier device or a merchant device.

3. The host computing device of claim 2, wherein the executable instructions, when executed by the processor, further cause the processor to perform the steps of:
retrieving a plurality of authorization messages for the previously approved payment card transactions, wherein each of the plurality of authorization messages is in the format of the ISO 8583 or ISO 20022 network messages;
modifying the retrieved plurality of authorization messages with the accepted delivery data for the plurality of purchased items associated with the plurality of previously approved payment card transactions, wherein the modifying the retrieved plurality of authorization messages further comprise formatting each of the modified authorization messages in the format of the ISO 8583 or ISO 20022 network message; and
storing the modified authorization messages.

4. The host computing device of claim 1, wherein the executable instructions, when executed by the processor, further cause the processor to perform the step of:
generating in response to the determining that the at least one disputed charge is friendly fraud, a recommendation whether to initiate a chargeback dispute relating to the previously approved payment card transaction via the multi-party payment processing system.

5. The host computing device of claim 1, wherein the executable instructions, when executed by the processor, further cause the processor to perform the steps of:
generating, in response to the determining that the at least one disputed charge is friendly fraud, a communication to the cardholder relating to the at least one disputed charge and the delivery data.

6. The host computing device of claim 5, wherein the executable instructions, when executed by the processor, further cause the processor to perform the step of:
requesting a confirmation from the cardholder whether to continue disputing the at least one disputed charge after receiving the communication.

7. The host computing device of claim 6, wherein, the executable instructions, when executed by the processor, further cause the processor to perform the step of:
in response to the requested confirmation, either cancelling the chargeback process or initiating a chargeback dispute in the multi-party payment processing system.

8. The host computing device of claim 1, wherein the executable instructions, when executed by the processor, further cause the processor to perform the step of:
generating a fraud alert in response to the determining that the at least one disputed charge is friendly fraud.

9. The host computing device of claim 1, wherein the instructions, when executed by the processor, further cause the processor to perform the steps of:
based on said analyzing the second-modified authorization message including the delivery data, confirming the purchased item was not delivered to the cardholder; and
in response to said confirming, accepting chargeback of the at least one dispute charge.

10. The host computing device of claim 1, wherein the generating the recommendation further comprises sending the recommendation to an issuer associated with the payment card transaction.

11. A method for electronically responding to disputed charges for payment card transactions processed and approved by a multi-party payment processing system, using a host computing device in communication with an electronic payment card processing system including the multi-party payment processing system and network that processes payment card transactions and clears and settles authorized payment card transactions, the method comprising:
receiving, at a first time by the host computing device, a first carrier code of a plurality of carrier codes from a delivery carrier, the first carrier code comprising a value representing a delivery carrier entity of the delivery carrier in possession of a purchased item associated with a payment card transaction that was previously approved through the multi-party payment processing system, wherein the first time is after a time at which the payment card transaction was previously approved and after possession of the purchased item by the delivery carrier;
in response to receiving the first carrier code, retrieving, by the host computing device, an authorization message associated with the payment card transaction, wherein the authorization message is in a format of an ISO 8583 or an ISO 20022 network message;
generating, by the host computing device, a first-modified authorization message by modifying the authorization message with the first carrier code, wherein the generating the first-modified authorization message further comprises formatting the first-modified authorization message in the format of the ISO 8583 or ISO 20022 network message;

storing, by the host computing device, the first-modified authorization message;

receiving, at a second time by the host computing device, a second carrier code of the plurality of carrier codes from the delivery carrier, the second carrier code comprising a value representing at least one of (i) a delivery time and date and (ii) a delivery status of the purchased item, wherein the second time is after the first time and after delivery of the purchased item;

in response to receiving the second carrier code, retrieving, by the host computing device, the first-modified authorization message;

generating, by the host computing device, a second-modified authorization message by modifying the first-modified authorization message with the second carrier code, wherein the generating the second-modified authorization message further comprises formatting the second-modified authorization message in the format of the ISO 8583 or ISO 20022 network message;

storing, by the host computing device, the second-modified authorization message;

receiving, at a third time by the host computing device, at least one disputed charge for the purchased item associated with the payment card transaction, wherein the at least one disputed charge is initiated by a cardholder of the payment card transaction for a chargeback process, wherein the third time is after the second time and after initiation of the disputed charge by the cardholder;

in response to receiving the at least one disputed charge, retrieving, by the host computing device, the second-modified authorization message; and based on the retrieved second-modified authorization message, determining, by the host computing device, that the at least one disputed charge is friendly fraud by analyzing delivery data of the purchased item, wherein the analyzing the delivery data further comprises analyzing the first and second carrier codes of the second-modified authorization message.

12. The method of claim 11, further comprising:
accepting, by the host computing device, delivery data for a plurality of purchased items associated with a plurality of payment card transactions that were previously approved through the multi-party payment processing from at least one of a delivery carrier device or a merchant device.

13. The method of claim 12, further comprising:
retrieving, by the host computing device, a plurality of authorization messages for the previously approved payment card transactions, wherein each of the plurality of authorization messages is in the format of the ISO 8583 or ISO 20022 network message;
modifying, by the host computing device, the retrieved plurality of authorization messages with the accepted delivery data for the plurality of purchased items associated with the previously approved payment card transactions, wherein the modifying the retrieved plurality of authorization messages further comprises formatting each of the modified authorization messages in the format of the ISO 8583 or ISO 20022 network message; and
storing, by the host computing device, the modified authorization messages.

14. The method of claim 11, further comprising:
generating, by the host computing device and in response to the determining that the at least one disputed charge is friendly fraud, a recommendation whether to initiate a chargeback dispute relating to the previously approved payment card transaction via the multi-party payment processing system.

15. The method of claim 11, further comprising:
generating, by the host computing device and in response to the determining that the at least one disputed charge is friendly fraud, a communication to the cardholder relating to the at least one dispute charge and the delivery data.

16. The method of claim 15, further comprising:
requesting, by the host computing device, a confirmation from the cardholder to confirm whether to continue disputing the at least one disputed charge after receiving the communication.

17. The method of claim 16, further comprising:
in response to the requested confirmation, either cancelling, by the host computing device, the chargeback process or initiating, by the host computing device, a chargeback dispute in the multi-party payment processing system.

18. The method of claim 11, further comprising generating, by the host computing device, a fraud alert in response to the determining that the at least one disputed charge is friendly fraud.

19. A non-transitory computer readable medium that includes computer executable instructions for electronically responding to disputed charges for payment card transactions processed by a multi-party payment processing system, that when executed by at least one processor of a host computing device in communication with an electronic payment card processing system including the multi-party payment processing system and network that processes payment card transactions and clears and settles authorized payment card transactions, further cause the at least one processor to perform the steps of:

receiving, at a first time, a first carrier code of a plurality of carrier codes from a delivery carrier, the first carrier code comprising a value representing a delivery carrier entity of the delivery carrier in possession of a purchased item associated with a payment card transaction that was previously approved through the multi-party payment processing system, wherein the first time is after a time at which the payment card transaction was previously approved and after possession of the purchased item by the delivery carrier;

in response to receiving the first carrier code, retrieving an authorization message associated with the payment card transaction, wherein the authorization message is in a format of an ISO 8583 or an ISO 20022 network message;

generating a first-modified authorization message by modifying the authorization message with the first carrier code, wherein the generating the first-modified authorization message further comprises formatting the first-modified authorization message in the format of the ISO 8583 or ISO 20022 network message;

storing the first-modified authorization message;

receiving, at a second time, a second carrier code of the plurality of carrier codes from the delivery carrier, the second carrier code comprising a value representing at least one of (i) a delivery time and date and (ii) a delivery status of the purchased item, wherein the second time is after the first time and after delivery of the purchased item;

in response to receiving the second carrier code, retrieving the first-modified authorization message;

generating a second-modified authorization message by modifying the first-modified authorization message with the second carrier code, wherein the generating the second-modified authorization message further comprises formatting the second-modified authorization message in the format of the ISO 8583 or ISO 20022 network message;

storing the second-modified authorization message;

receiving, at a third time, at least one disputed charge for the purchased item associated with the payment card transaction, wherein the at least one disputed charge is initiated by a cardholder of the payment card transaction for a chargeback process, wherein the third time is after the second time and after initiation of the disputed charge by the cardholder;

in response to receiving the at least one disputed charge, retrieving the second-modified authorization message; and based on the retrieved second-modified authorization message, determining that the at least one disputed charge is friendly fraud by analyzing delivery data of the purchased item, wherein the analyzing the delivery data further comprises analyzing the first and second carrier codes of the second-modified authorization message.

* * * * *